United States Patent [19]

Goulet

[11] Patent Number: 4,812,670
[45] Date of Patent: Mar. 14, 1989

[54] THEFT PROTECTION CABLE AND CIRCUIT INCLUDING SAID CABLE

[76] Inventor: Michel Goulet, 18, rue Nelaton, F-75015 Paris, France

[21] Appl. No.: 95,603
[22] PCT Filed: Dec. 5, 1986
[86] PCT No.: PCT/FR86/00421
   § 371 Date: Aug. 6, 1987
   § 102(e) Date: Aug. 6, 1987
[87] PCT Pub. No.: WO87/03735
   PCT Pub. Date: Jun. 18, 1987

[30] Foreign Application Priority Data

| Dec. 9, 1985 | [FR] | France | 85 18170 |
| Feb. 26, 1986 | [FR] | France | 86 02631 |
| Apr. 23, 1986 | [FR] | France | 86 05848 |
| Jun. 4, 1986 | [FR] | France | 86 08034 |
| Jun. 6, 1986 | [FR] | France | 86 08166 |
| Jun. 18, 1986 | [FR] | France | 86 08773 |
| Jun. 30, 1986 | [FR] | France | 86 09424 |
| Jul. 30, 1986 | [FR] | France | 86 11023 |
| Oct. 1, 1986 | [FR] | France | 86 13669 |

[51] Int. Cl.⁴ .............................................. H01H 5/00
[52] U.S. Cl. ................................. 307/10.2; 307/10.1; 180/283; 180/289; 200/52 R; 340/429; 70/241
[58] Field of Search ............ 307/10 R, 10 AT, 10 BP; 200/61.47, 61.52, 64, 42 R, 43, 44, 61.93; 361/171, 179, 172; 180/289, 283, 287; 70/240, 241, 237, 238, 239, 256, 257; 340/63, 64, 65

[56] References Cited

U.S. PATENT DOCUMENTS

| 2,563,335 | 8/1951 | Istrati | 200/52 |
| 2,820,149 | 1/1958 | Roth | 307/10 |
| 3,692,965 | 9/1972 | Gardner | 307/10 AT X |
| 3,820,361 | 6/1974 | Leitner | 307/10 AT X |
| 4,049,073 | 9/1977 | Gebert | 180/283 |
| 4,099,593 | 7/1978 | Schultz | 180/289 |
| 4,102,164 | 7/1978 | Barbush | 70/241 |
| 4,306,126 | 12/1981 | Howard | 200/52 R |
| 4,410,775 | 10/1983 | Howard | 200/52 R |
| 4,538,135 | 8/1985 | Turner | 340/65 X |

FOREIGN PATENT DOCUMENTS

| 0161365 | 11/1985 | European Pat. Off. . |
| 0647129 | 11/1928 | France . |
| 0970654 | 1/1951 | France . |

Primary Examiner—William M. Shoop, Jr.
Assistant Examiner—Paul Ip
Attorney, Agent, or Firm—Steele, Gould & Fried

[57] ABSTRACT

A theft protection electric cable includes at least one conducting core, a sheath which is least partially insulating, and a suitable connection. The cable is characterized in that it is connected between a source of electrical voltage and a user member by at least one contactor (3), said contactor receiving information concerning the conducting or non-conducting state of the cable and including a spring or switch (11, 34) for interrupting the passage of electricity as a function of said information.

17 Claims, 12 Drawing Sheets

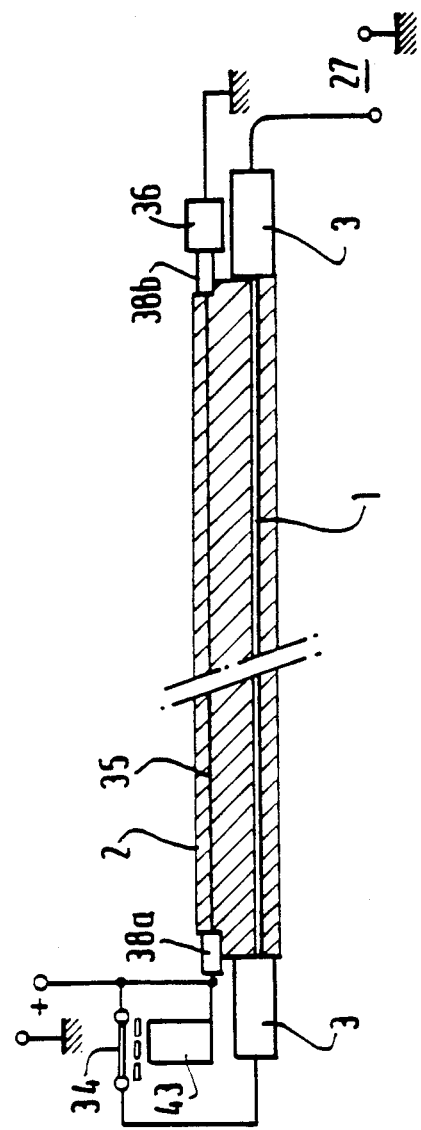

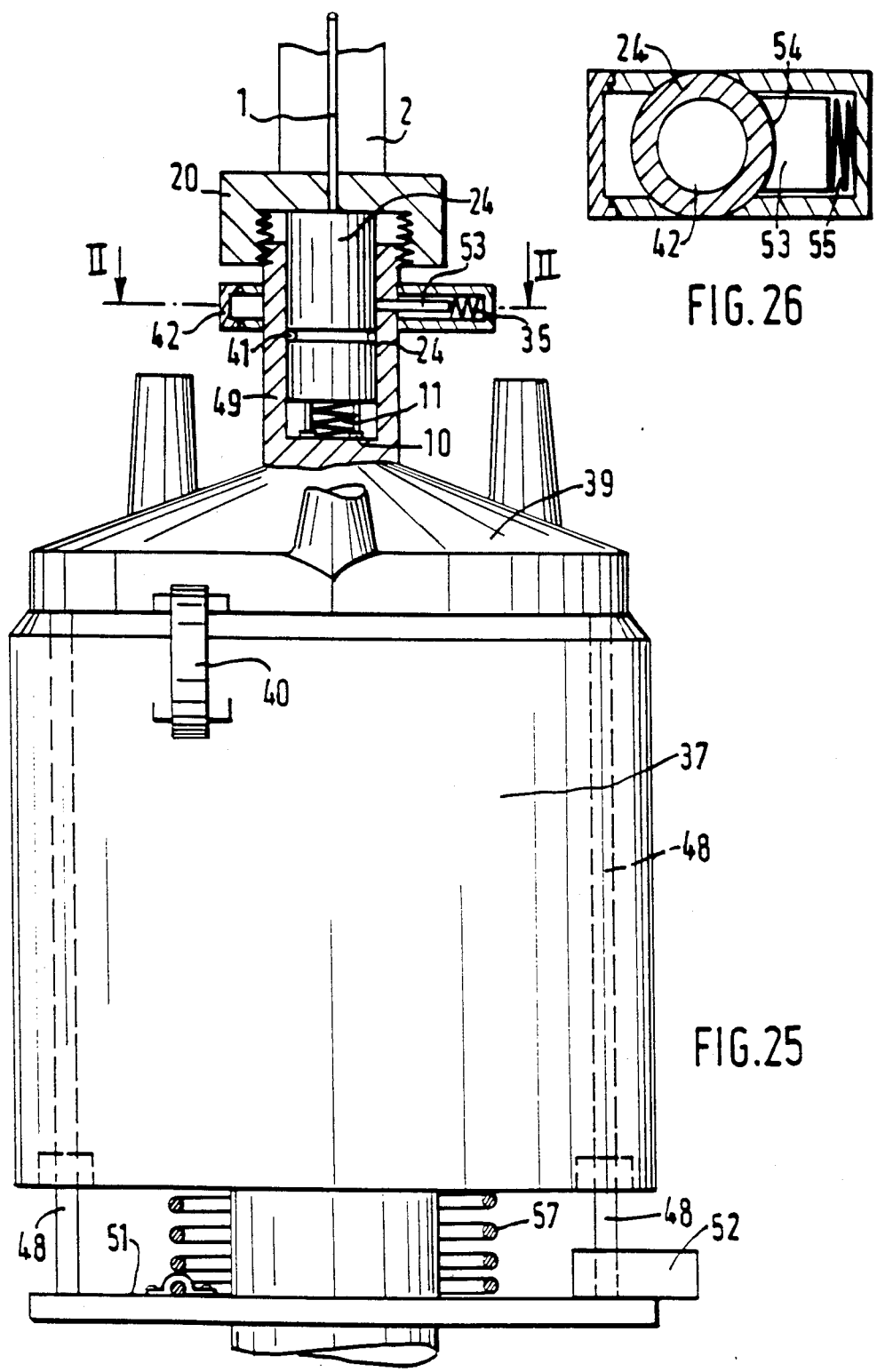

THEFT PROTECTION CABLE AND CIRCUIT INCLUDING SAID CABLE

The present invention relates to a theft protection electric cable of the type comprising a conductive inner core and an insulating outer sheath, and also to a circuit including said cable and intended particularly, but not exclusively, for self-propelled land, water, or air vehicles.

These days, motor vehicle theft is reaching epidemic proportions. The existence of an ignition key which the owner takes away constitutes a first precaution, with said ignition key acting simultaneously to switch off the engine's ignition circuit and to mechanically lock the steering column. Vehicles are usually stolen by fraudulently switching on the engine, either by means of counterfeit ignition keys, or else by means of temporary electrical connections which short-circuit the security devices, and in particular the key-operated switch block. The aim of the present invention is to prevent this second type of theft.

In order to establish temporary electrical connections to the starter and to the engine, the most usual technique consists in stripping the ends of an electric cable and in making a connection to its core. The present invention seeks to remedy this drawback by preventing access to the core of an electric cable when a portion of the cable is stripped.

French patent document FR-A-647 129 already describes an elastic electrical conductor. Regardless of its diameter or its length, this conductor is constituted by a steel wire wound in tight coils to constitute a genuine traction spring which may be bare or insulated when in use. When the conductor is insulated, it is housed inside an elastic insulating tube. An elastic electrical conductor is thus obtained capable of being elongated to several times its initial length without damaging or fatiguing its metal coils.

U.S. Pat. No. 2,820,149 (ROTH) describes a device for preventing motor vehicle theft whereby the ignition key block is connected to the contact breaker by a cable comprising a metal sheath, an insulating layer, and a rectilinear core. The insulating layer is spiral-wound and under tension such that when the cable is broken, the insulating sheath retracts, thereby giving rise to a short-circuit between the conductive core and the outer metal sheath which is connected to ground. Such a circuit does not prevent a parallel connection being set up between the ignition key housing and the contact breaker, which is in turn connected to the ignition coil.

U.S. Pat. No. 2,563,335 (ISTRATI) describes a security device controlled by a lever located inside the vehicle cabin, which device disconnects the ignition system from the battery when the lever is in a given position. Here again, the device does not prevent parallel connections from being established, thereby enabling the vehicle to be used fraudulently.

The electrical supply circuit of a vehicle is in the form of a succession of lengths of interconnecting members each providing a particular function, and in particular there are the following lengths: battery to ignition keys; ignition key to starter relay; ignition key to ignition coil; ignition coil to contact breaker; etc...

When a wire has been cut or ripped out at one end, its other end remains connected, and as a result it may be used for bypassing a member, e.g. the ignition key block.

A first aim of the present invention is to prevent a portion of the original circuit being used to establish a parallel circuit after a connection has been disconnected.

However, if the contactors remain in condition, it would naturally still be possible to connect a replacement cable between the two end contactors. Thus, a second aim of the present invention is to prevent the connectors or contactors delimiting a length which has been disconnected at one of its ends or which has been interrupted at some point along the cable from being used after such a disconnection.

To this end, the present invention provides not only for interruption of the current path by means of end contactors for the cable, but also for contactor locking to prevent further use thereof without disassembly which takes time and requires special tools. Under such conditions, a vehicle cannot be started very quickly, thereby dissuading potential thieves.

According to the present invention, the theft protection electric cable comprising at least one conductor core, a sheath which is insulating at least in part, and connection means, is characterized in that it is connected between a source of electric voltage and the user member by means of at least one contactor, said contactor receiving information on the conducting or non-conducting state of the cable, and having means for interrupting the current path as a function of said information. Thus, a break at some point along the cable not only interrupts the current path at the point of breakage, but also at the contactors.

In accordance with another characteristic of the invention, the information concerning the conducting or nonconducting state of the cable acts on contactor locking means.

Advantageously, the information is transmitted by the cable itself, i.e. by the core or by the sheath. Said information may be transmitted by mechanical means, by electrical means, or by other means. It indicates to the contactor whether the cable is conducting or is non-conducting. An interruption at any point along the cable causes a switchover from the conducting state to the locked non-conducting state.

In the case where the core and the sheath are free to move relative to each other, the establishment of an electric current path may be due to the relative position between the conducting wire (or core) and the insulating sheath, and in this case physically breaking the core gives rise not only to an interruption of the current path along the core, but also to the housing being locked.

In accordance with another characteristic of the invention, once assembled, the core is under mechanical tension and it maintains mechanical contact between the parts of the connection housing.

In accordance with yet another characteristic of the invention, the core is spiral-wound, with the sheath being inextensible, and the length of the spiral at rest is shorter than the length of the sheath.

Naturally it is desirable for the outer sheath to be as strong as possible. Thus, it is preferable for the outer sheath to be made from a plastic material which is reinforced with longitudinal fibers of a substance which is strong in traction. In particular, once it has become possible to make contact with one end of the conductor, it is important that the sheath cannot easily be pulled away to allow a thief to connect a spare cable to the other end of he connection. Advantageously, the outer sheath is made of a plastic material which is difficult to cut, such as Rilsan reinforced with longitudinal fibers which may be made of an aromatic polyamide or Kevlar, or else may be made of steel.

The security obtained in this way by the structure of the cable is fully justified only in a case where the ends of the cable are sealed inside tamper-proof contactor blocks. Thus, the present invention relates to a circuit implementing the invention and characterized in that the core is connected at each end to a moving connection part inside a contactor, said connection part being capable of being locked inside the contactor fixed on the vehicle.

The spiral core may be wound on or integrated in an insulating elastic reinforcement member. Thus, the functions of conducting electricity and of applying mechanical tension are disassociated, thereby making it possible for the core of the conductor to be constituted by an electric wire without any special mechanical characteristics other than the presence of regions of reduced mechanical strength at its ends.

It has been observed that it is not necessary for the tension exerted on the cable to result from the cable itself. Consequently, the cable, or more precisely its core, may be rectilinear and/or linear, with the tension being applied by means of springs. It may also be wound only along a small portion of its length.

In one embodiment, the cable core interconnecting the two contactors is linear, at least in part, with the tension established between the two contactors causing, at each end, a part fixed to the end of the core to be pressed against a conducting zone while compressing a spring, the conducting zone being connected to a source of electricity or to a user apparatus.

Thus, it is the spring in each housing operating under compression which provides the tension on the core rather than its own spiral structure.

However, for assembly purposes, it is necessary for the sheath to be removably mounted on the housing. Even if locking means are provided, said sheath should always be fairly easy to disassemble. If the movements of the sheath and the electric wire are independent so as to allow relative sliding of the core in order to interrupt the path of electrical current, the theif may be able to gain access to the core which has not been interrupted, said core still being electrically conductive.

Advantageously, the circuit including the theft protection cable in which the electric wire is capable of moving relative to the sheath, said wire still being connected at at least one of its ends to a contact part capable of sliding inside a contactor and being loaded by a spring, is characterized in that the contact terminal is protected by a sleeve which is longer than the terminal.

It thus becomes impossible to make a parallel connection after removing the sheath without breaking the central wire. In order to facilitate relative movement between the core and the sheath, balls may be disposed between these two components. Such balls transfer a radial force (e.g. when an attempt is being made to cut the cable using pliers) into a longitudinal force which is applied to the sheath, thereby giving rise to an interruption action in the housing. Advantageously, the balls may be replaced by small truncated cones which bear against the core during an attempt at cutting the cable in order to pull it in one direction and push it in the opposite direction. In this case, one of the end contactors opens.

The present invention also seeks to cover the case where the insulating sheath and the conductive core are mechanically fixed together, which is the case that applies to ordinary cables where the conductive wire is embedded in an insulating sheath.

According to yet another characteristic of the invention, in a theft protection circuit including an electric cable, with at least one end of the cable core being fixed to a moving part inside a housing, the moving part is pressed against a conducting surface by compression means, with second means preventing contact of the moving part with the conducting surface once the cable has been subjected to traction.

Thus, the conducting core may be embedded in an insulating sheath and fixed thereto, whether or not the sheath is reinforced. Preferably, the sheath should withstand shear and drilling, and since any attempt to apply shear always gives rise to traction on the cable, said traction gives rise to disconnection, i.e. the spring is compressed and the part inside the housing is displaced. The presence of the locking means prevents contact from being re-established without action by a specialist who will need to disassemble the housing. The body of the contactor itself is fixed to the member which is to be protected or else to a panel when the ignition key area is to be protected.

The present invention provides security when the sheath is subjected to an attempt at dismantling, as in the case where the core is cut supposing that the core can move relative to the sheath. In a cable comprising a conducting core and an insulating sheath surrounding the core, the core and the sheath being capable of being subjected to relative translation, at least one end of the cable core being fixed to a moving part inside a box, the cable is characterized in that a sleeve is fixed to the sheath, with the sleeve surrounding the core and penetrating inside the housing in such a manner as to come into abutment against a plate bearing an electric contact, the moving part includes a zone of reduced diameter at its front end capable of passing through an opening formed in a plate fixed inside the housing, and a spring is disposed between the bottom of the contact part and the contact-carrying plate.

According to another characteristic of the invention, the contact-carrying plate is provided with resilient lugs whose free ends bear either against the side wall of the bottom of the part, or else against the side wall of the part. These lugs serve to constitute locking abutments preventing current from being re-established after an attempt has been made at theft. Thus, in accordance with the present invention, once the core has moved relative to the sheath, the electric current path is interrupted both if the core is cut and if the sheath is disassembled.

In another embodiment, at least one conductive wire connected at each end to electric current interrupting means is embedded inside the sheath. When the conductive wire is cut at the beginning of sheath shearing, a signal is provided indicative of the existence of a fraudulent maneuver, which signal may trigger an alarm. The main circuit is preferably cut when this conductor is cut.

In this case, the means for interrupting the electric current comprise at least one electromagnetic switch connected in series in the main feed circuit.

Advantageously the sheath is removably mounted on the top end of the ignition head, with the cable core being fixed to a skirt which establishes contact between the core and a conductive area on the ignition head when the sheath is suitably mounted.

Other characteristics and advantages of the present invention appear from the following description of particular embodiments, given purely by way of non-limiting examples, and with reference to the accompanying drawings, in which:

FIG. 24 shows another embodiment of the invention;

FIG. 25 is a fragmentary vertical section view of a distributor fitted with a housing in accordance with the invention;

FIG. 26 is a section view from above on line II—II of FIG. 25, showing the non-return locking member.

Figure 1:
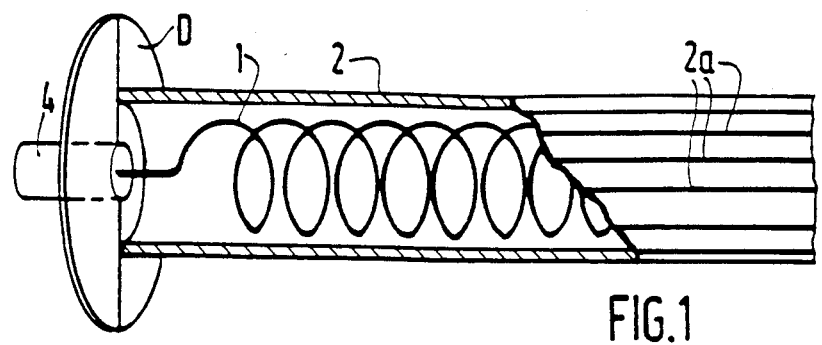
FIG. 1 is a view of a cable in accordance with the invention having its sheath partially cut away.

In FIG. 1, it can be seen that the cable is constituted by an electric wire 1 constituting the spiral-wound core. This wire has the elasticity required to constitute a kind of spring. The spiral is included inside an insulating sheath 2 made of "Rilsan" (registered trademark), for example, having longitudinal reinforcing threads 2a made of aromatic polyamide or of steel, for example, so as to have considerable resistance to attempts at cutting it. Given the strength of the sheath 2, if it is cut, then the wire 1 will automatically be cut too. Once the cable has been cut, the wire 2 retracts inside the sheath. Naturally, the length of each cable is determined to correspond to the exact path between a sealed metal contactor box located inside the engine compartment or beneath the vehicle floor, and the key-operated contactor which is generally situated in the vicinity of the steering column. The electric wire 1 is fixed at each end to respective contact parts 4. In addition to their conventional function, these contact parts also act as traction elements for maintaining the spiral conductor wire 1 under tension. The connection between the wire 1 and the terminal 4 is advantageously weakened in the transverse direction. To this end, prior to assembly, disks D (which may be split disks) are disposed behind the connection parts 4 on the inside-cable side in order to keep the core 1 under tension. At this moment the tension is close to the breaking point of the wire 1. The tension is continuously applied to the spiral by external items mounted in a contactor.

The connection part 4 (which may be cylindrical in section for example), may have a radial hole in which a conductive peg may be inserted connected to the high voltage terminal of the engine electricity circuit. In the embodiment shown in FIGS. 2 and 3 (from which the housing of the contactor has been omitted), reference 16 indicates the wall against which the contactor housing is mounted, and the part 4 passes through an orifice 8 provided in a plate 9 which is fixed to the connection housing. The plate 9 is insulating but it has a conducting surface 10 on its side inside the housing (to the left in the figure). The surface 10 is connected to the positive terminal of the battery, for example.

Figure 2:
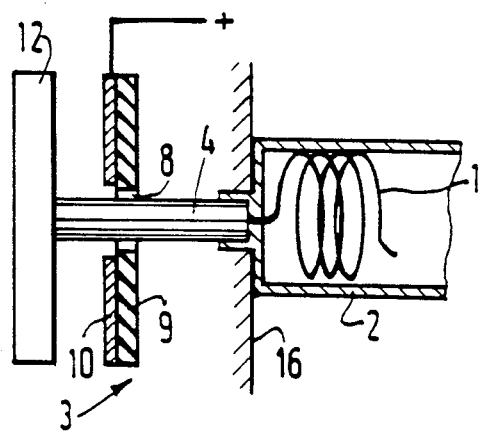
FIGS. 2 and 3 are sections through the end of the cable in accordance with the invention mounted in a connector block, shown in a non-conducting position and in a conducting position, respectively.
Figure 3:
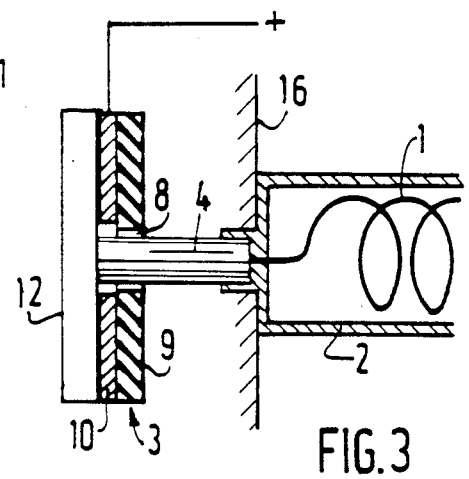

Assembly takes place as follows. The part 4 is inserted inside the insulating connection part 9 via orifice 8, 8a. At this moment, the conductor 1 is still maintained under tension by the disks D. The tension-maintaining disk D is then separated into two portions and is removed from the housing being assembled. In the embodiment shown in FIGS. 2 and 3, the peg has been replaced by a peg 12 which is fixed to the part 4. Under the influence of the extraction force exerted by the sprial wire 1, the part 4a is pulled to the right of the figure (FIG. 3), bringing the end thereof into contact with the conducting surface 10, thus establishing contact at one end of the cable. The same applies to the other end. The cable is thus under tension between its two connection parts 9 and remains in this position until an attempt at fraud occurs. When the cable is cut, the wire 1 is cut and it retracts inside the sheath as mentioned above. This traction releases the contact exerted by the cap 4a on the surface 10 and contact is also broken, as shown in FIG. 2. Further, since contact cannot be directly re-established, it is impossible to interconnect the two parts electrically.

Figure 4:
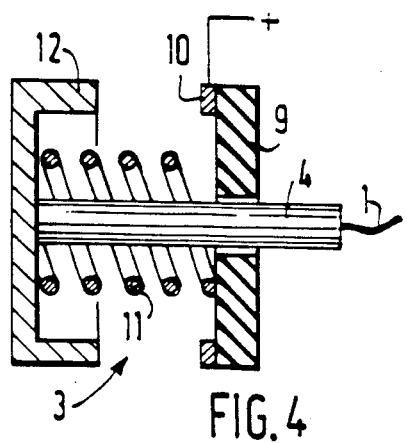
FIG. 4 is a section view of a particular embodiment.

FIG. 4 shows a variant embodiment in which the spirally-wound wire 1 is terminated at each end by a head 12. As before, the wire 1 passes through a hole 8 provided in an insulating part 9 bearing a conductive peripheral zone 10. Between the part 9 and the end 4 of the conductive wire 1 there is a return spring 11 whose coefficient of compressibility is considerably less than that of the spring constituted by the wire 1. Thus, during normal assembly and use of the cable in accordance with the invention, the core 1 applies tension to the part 4 causing the branches of the U-shaped member 12 to come into contact with the conducting zones 10 of the part 9. The spring 11 is compressed and contact is normally established. However, when the wire 1 is cut (as shown in FIG. 4), the return spring 11 moves the part 4 away from the conducting zone 10 and contact is broken. Locking is provided to prevent the contact 4 from returning to the zone 10. It is also possible to provide for the rod 4 to move so far that it falls inside the housing. As before, contact cannot be re-established fraudulently and after such an operation it is necessary to mount a new cable on the vehicle.

Figure 5:
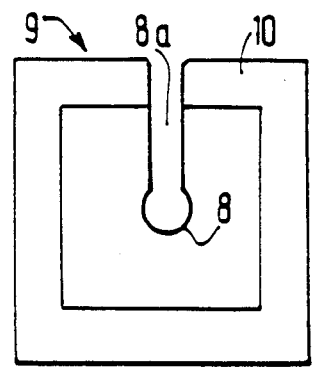
FIG. 5 is a front view of a conducting part enabling the cable to be put into place.

FIG. 5 is a face view of a connection plate 9 and on this part there can be seen an outer conducting zone 10, and a slot 8a for passing the rod 4 and leading into a hole 8. The connection plate 9 is included inside a tamper-proof security housing 3.

Figure 6:
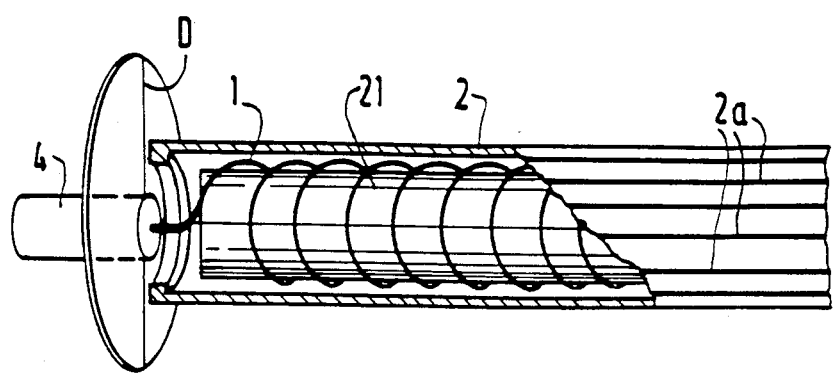
FIG. 6 shows another embodiment of the cable.
Figure 7:
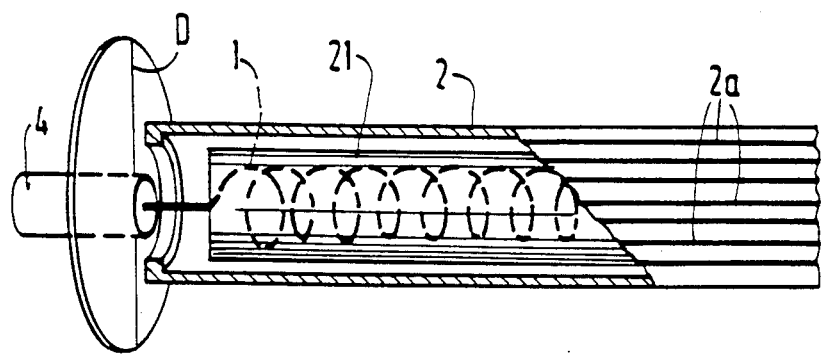
FIG. 7 shows another embodiment.

In the embodiment shown in FIG. 6, the conducting wire 1 is spiral-wound on a reinforcement member 21 having constant longitudinal elasticity, e.g. neoprene. At each end of the reinforcement member 21, the wire 1 penetrates into the reinforcement member so as to emerge radially therefrom and be soldered (or more generally be electrically connected) to a peg 4, with the assembly being put into position under tension. Alternatively, as shown in FIG. 7, the turns of the core 1 may be embedded inside the reinforcement member 21. As a result the core-constituting electric wire 1 need not necessarily have considerable elastic characteristics, since the required elasticity is provided by the reinforcement member.

Preferably, the reinforcement member 21 is made of neoprene having a Shore hardness lying between 100 and 140, and is under a tension of about 700 g giving an extension of 5% to 6%. In this embedded core embodiment, it is practically impossible to strip the wire.

However, the relative hardness of the neoprene gives rise to the core retracting less when the conductor is cut. Also, the cable is connected between two contactors in which contact can only be maintained by tension in the conductive core, regardless of the contour which the cable is caused to follow inside the vehicle.

Figure 8:
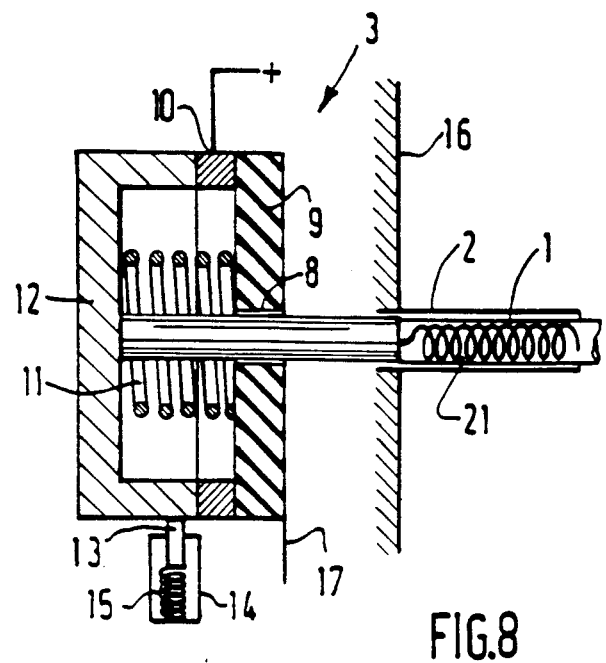
FIG. 8 is a diagrammatic view of a connection housing during normal operation.
Figure 9:
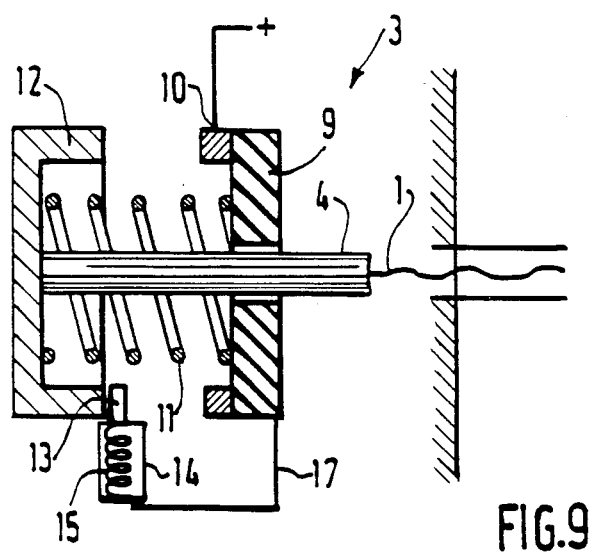
FIG. 9 is a view of the same device after the cable has been cut at the opposite end.

FIGS. 8 and 9 show one of the housings 3, respectively in the conducting or contact position and in a non-conducting position. These figures again show a connector tab 4 having a head 12, and an insulating plate 9 with a central orifice and a conducting peripheral zone 10. A return spring 11 is interposed between the plate 9 and the head 12. Naturally, the coefficient of compressibility of the spring is much less than that of the spring constituted by the assembly of the core 1 and the reinforcing member 21.

In FIG. 8, the branches of the U-shaped head 12 are pressed against the conducting zones 10 of the part 9 under the effect of the traction exerted by the core 1. A retractable abutment 13 is disposed beneath the part 12, with the abutment 13 being biased by a spring 15 included in a recess 14 fixed to the wall 17 of the housing. When the cable is put into place, the abutment is retracted into the recess 14, thereby compressing the spring 15. Reference 16 indicates a fixed wall of the vehicle.

When a theft attempt is made on the cable, the part 12 is moved back as shown in FIG. 9, thereby disconnecting the cable 1 from the electricity supply. However, during this movement, the abutment 13 no longer bears against the head 12. As a result it projects out from the recess 14 thereby preventing the head from returning rightwards in the figure, i.e. the abutment 13 prevents contact from being re-established. Contact is therefore permanently broken. As a result, even a small displacement of the core 1 gives rise to permanent loss of any possibility of re-establishing the circuit.

Naturally, any other conventional locking device could be implemented. The vehicle is thus immobilized, and it can only be put back into working order by a technician re-establishing the necessary connections.

Figure 10:
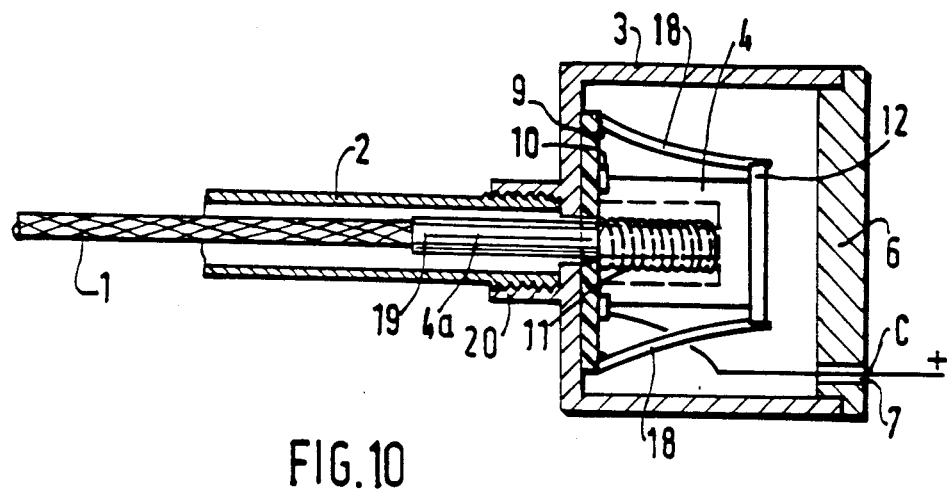
FIG. 10 is a view showing the end of a cable together with its connection housing when in the conductive position.
Figure 11:
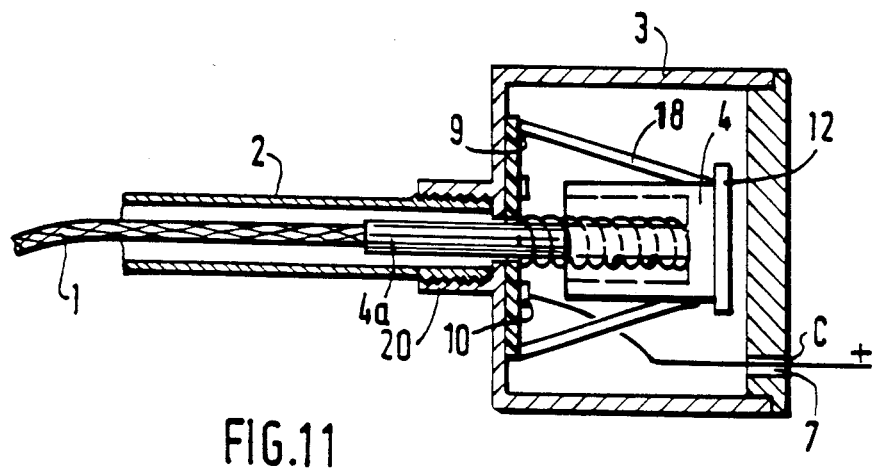
FIG. 11 shows the positions of the various components of the device after the cable has been broken.

FIG. 10 is a vertical section through a contactor showing the sheath 2 being fixed to a housing 3 by means of a cable guide 20. The conducting core 1 is fixed to a connector 4a whose front portion projects partially therefrom outside the housing 3. This fixing may be provided by soldering and crimping in the conventional manner for connector tabs in motor vehicles, or else it may be provided by means of a screw, or else by a combination of both means. The presence of a screw connection makes it possible to adjust the tension in the cable, with unscrewing being prevented by subsequent soldering. The moving part is constituted by a cylindrical body 4 within which the connector tab 4a is fixed. The rod 4a is connected to the core 1 at 19. In accordance with a characteristic of the invention, the cylindrical body 4 extends at its rear end in the form of a disk 12 whose outside diameter is greater than the diameter of the cylindrical body 4.

Resilient arms 18 bear against the periphery of said disk, and their function is described below. The housing 3 is closed by a cover 6 which may be screwed into place with an epoxy glue of the type known under the name "Loctite" (registered trademark) being interposed.

In the position shown in FIG. 10 (conducting position) the front portion of the cylindrical part 4 bears against a conducting area 10. The cylindrical part is held in place and contact is established under the effect of the tension applied by the core 1. This tension compresses a spring 11 against an insulating plate 9 which is disk-shaped and which carries the conducting area 10. An identical spring is disposed inside the housing at the other end of the cable, and the two springs 11 are calibrated so that the tension exerted on the cable is in the range one to two kilograms in order to avoid accidental disconnection. In addition, the plate 9 serves to hold the resilient arms 18 at their front ends, with their rear ends resting against the flange 12. The cover 6 has an opening 7 through which there passes an electric cable C which is connected, for example, to the positive terminal of the storage battery. The conductor C is naturally connected to the conducting area 10. The spring 11 bears firstly against the rear face of the insulating plate 9 and secondly against the bottom of the cavity provided inside the cylindrical body 4.

When the cable is sheared, the tension exerted thereon by the pair of springs 11 at each of its ends is interrupted. Consequently, the part 4 moves backwards under the action of the spring 11 expanding away from the point of shear, and the same happens to the corresponding part in the other housing. During this movement, the resilient arms 18 snap down along the body 4, and contact is lost between the body 4 and the circuit 10. By snapping down onto the body 4, the resilient arms 18 constitute abutments preventing the part 4 from moving back towards the zone 10, and consequently preventing electrical contact from being re-established.

Figure 22:
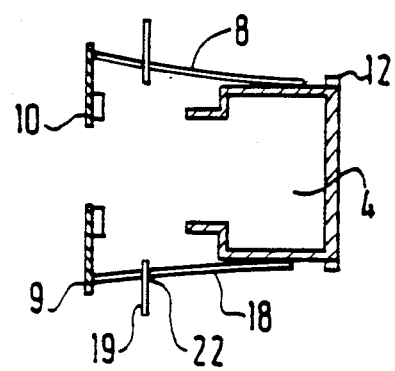

FIGS. 10 and 22 show two diametrically opposite arms, but naturally there could be any suitable number for obtaining the desired result. If necessary, notches could be provided in the disk 12 in order to lock the arms 18 after they have been released. Any other locking device could also be used.

Naturally, the core 1 must be capable of sliding freely inside the sheath 2, and preferably the core is coated on the outside with a layer of Teflon or with any other low coefficient of friction material in order to encourage the core to slide freely whenever it comes into contact with the sheath.

Figure 12:
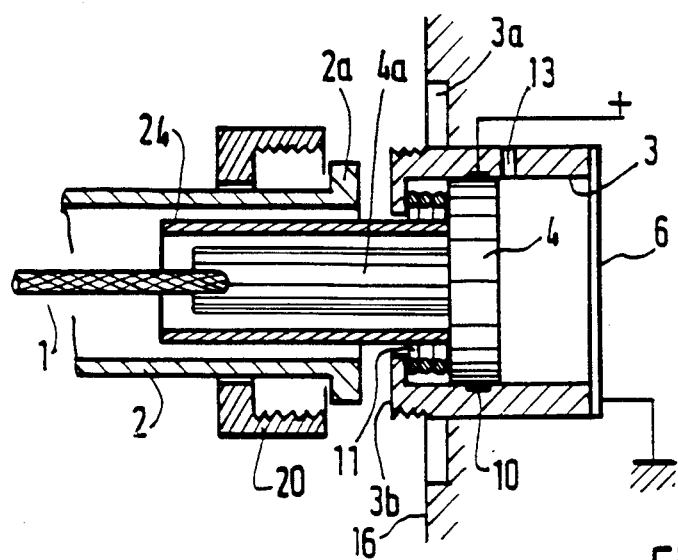
FIG. 12 is a section view of a device in accordance with the invention in the operating position at one of the ends of the cable in a circuit including a protective skirt.

FIG. 12 is a section in a vertical plane in which the core 1 is fixed to the contact part 4 which comprises a body whose section matches the internal section of the housing 3 and which extends towards the core in the form of a connector tab 4a. The rear portion of the housing is closed by a cover 6.

In FIG. 12, the outer edge of the part 4 comes into contact with a ring-shaped conducting zone 10 which is connected to the voltage source or to a user apparatus. The important thing is that in the event of a fraudulent manoeuver, the electrical circuit should be broken, and the other end of the cable may have either a housing or else a spring-loaded connector tab for providing the required mechanial tension. The housing 3 is bonded to the chassis of the vehicle 16 or to some other fixed wall by means of a flange 3a, e.g. by riveting or by welding. Naturally, in this case the inside surface of the housing 3 is insulating apart from the conducting zone 10. The sheath 2 is terminated at its front end (at its housing end) by an annular zone 2a which is pressed against the front face 3b of the housing 3 by a nut 20.

As shown in FIG. 12, the sheath can be disassembled by unscrewing the nut 20 while the cable is under mechanical tension and a path is provided for electric current. At this moment, the sheath can move back by a few millimeters, even if it is incompressible. This movement is also limited by the fact that the inner core cannot be subjected to additional tension without breaking, thereby reducing the scope for maneuver.

However, it would theoretically be possible to make a connection to the connector tab 4a by sliding a conductor between the front face of the housing 3b and the ring 2a of the sheath. In order to mitigate this drawback, a sleeve 24 is preferably provided surrounding the connector tab 4a so that direct access thereto is prevented under such circumstances. The sleeve may be insulating and fixed to the body 4 or else it may be constituted by an isolated metal wall of the body 4. Making a hole through the sleeve gives rise to additional tension on the wire 1 which will break, thereby interrupting the current path.

Figure 13:
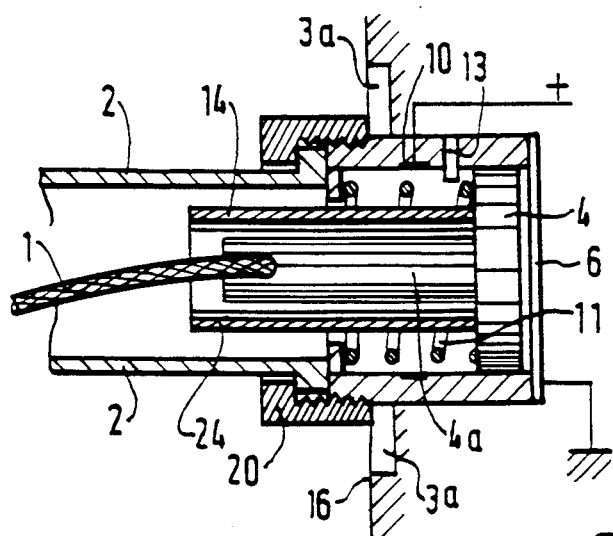
FIG. 13 is a view of the same device after the cable has been cut.

FIG. 13 shows the case where the core 1 has been broken without there having been any attempt at dissassembling the sheath at the end shown. As can be seen in the figure, the break in the wire 1 releases the spring 11 and consequently moves the piston constituted by the body 4 to the right of FIG. 13. As a result, the body 4 is retracted and current is disconnected from the wire 1. During this retraction movement, the abutment 13 moves downwardly and prevents the body 4 from returning towards the conducting zone 10. In order to avoid electrical problems, the bottom 6 of the housing 3 may be connected to ground, for example.

In the examples described so far, the core is always capable of sliding relative to the sheath. The embodiment shown in FIGS. 14 and 15 is intended to produce the theft-preventing effect against the cable being torn out, whereas the other embodiments described concern the cable being cut.

Figure 14:
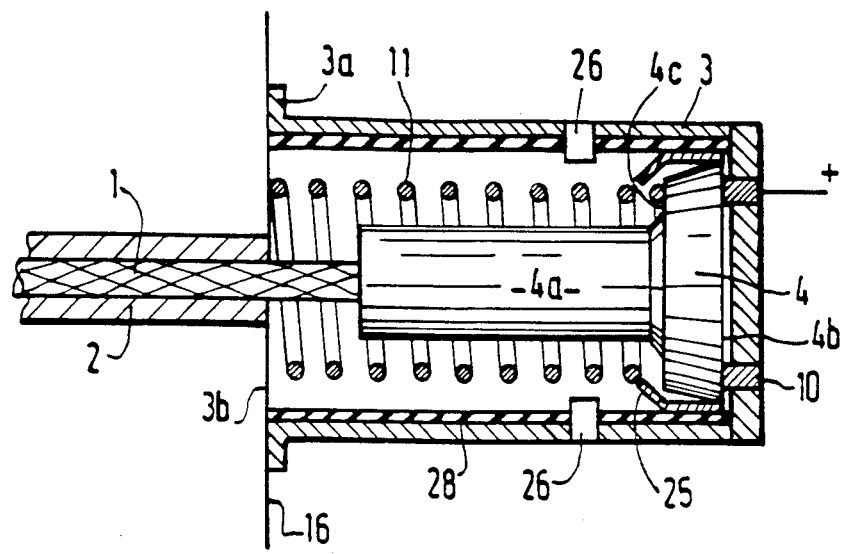
FIG. 14 is a section view of another embodiment of a housing in the conductive position.
Figure 15:
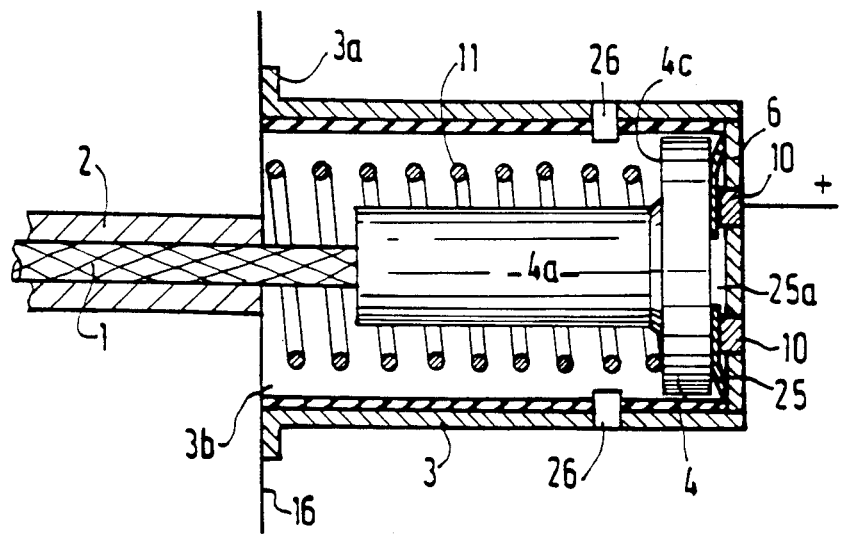
FIG. 15 shows the same housing after traction has been exerted on the sheath or on the core.

In FIG. 14, the core 1 of the cable is imprisoned within and fixed relative to a sheath 2. The end of the cable is stripped so as to enable the core 1 to be fixed, e.g. by soldering, to a connector tab 4a, which is in turn fixed to the contact part 4 without traction on the wire. As mentioned above, the part 4 is movable inside a contactor (which may be cylindrical in shape), with the housing 3 thereof being fixed to the chassis or the bodywork of a car by a flange 3a which is screwed or spot-welded into place. The inside of the housing is advantageously coated with an insulating layer 28 or with a sleeve of plastic material having a low coefficient of friction. The connector tab 4a is metal and conductive. In the example shown in FIGS. 14 and 15, there is also a spring 11 inside the housing bearing against the front face 3b of the housing and also against the face 4c of the moving part 4. In normal operation, as shown in FIG. 14, this spring is slightly compressed by virtue of its dimensions compared with the dimensions of the housing. As shown in this figure, the bottom 4b of the part 4 is pressed against the conducting surface 6 or against the annular zone 10 by the pressure from the spring 11 with the face 4b coming into contact in such a manner as to ensure that the contact area is not less than the cross-sectional area of the cable core 1. The zone 10 may be constituted by two contacts which close the control circuit to the trigger of a thyristor which controls the main current.

In accordance with the present invention, locking means are provided inside the housing 3. In the embodiment shown, these locking means are constituted by a collar 25 of resilient material whose rest diameter is less than the diameter of the area 4b of the contact part 4, supposing it to be cylindrical. The collar 25 is fixed in the bottom of the housing. When a fraudulent maneuver causes traction to be exerted on the conductor wire or on the sheath with a force which is greater than the resistance of the spring 11, the part 4 moves leftwardly in FIG. 14, i.e. towards the front of the contactor housing 3, and the spring 11 is compressed by an amount which is a function of the traction force which is applied to the cable. As it moves, the part 4 disengages from the collar 25 by spreading out the edges thereof, thereby leaving the collar in position at the end of the housing. To this end, the face 4c of the part 4 may be slightly frustoconical (FIG. 14) in order to facilitate disengagement, or else it may be cylindrical (as shown in FIG. 15). The movement of the part 4 breaks the electrical contact existing between the surface 10 and the core 1. When the force is released to the action of the spring 11 returns the part 4 to the right. However, during this return movement, it bears against the leading edge of the collar 25 by means of its surface 4b and presses the collar against the wall 6. The presence of this collar prevents any contact being established between the part 4 and the contact 10, and as a result there remains a gap 25a between the part 4 and the end 6. Contact cannot be re-established without dismantling the housing.

The collar 25 could be replaced by two or more resilient insulating arms of plastic material as described above. If their coefficient of elasticity is sufficient, the snap-action force obtained in this way may make it pointless to provide a spring 11, with the face 4b of the part 4 being applied with the appropriate pressure against the area 10. Naturally, after the part 4 has been pulled away it can move freely inside the housing 3, but this does not matter since the arms or the collar 25 prevent the current path from being re-established.

In this embodiment, only the ends of the core are under tension, and the cable is free between its two contactors. In addition, contact is ensured in a positive manner. However, breaking contact at one or other of the ends of the cable does not ensure that contact is broken at the other end, supposing it is of similar structure.

It is possible to provide two contact parts 26 inside the housing 3 such that when the part 4 moves forwardly, these contact parts serve either to close an alarm circuit or an anti-theft circuit supposing one exists on the vehicle, or else to cause a short-circuit suitable for blowing a fuse if one of the terminals 26 is ground and the other has a voltage applied thereto, or else to interrupt the circuit at the other end of the cable.

Naturally, any locking means may be used which ensure that a gap 25a subsists between the part 4 and the wall 6 after traction has been applied to the cable. Thus, for example, the peripheral wall of the part 4 may constitute a cam which modifies the position of a locking ratchet. Under such conditions, the application of any traction to the sheath interrupts the current path at the end thereof where said traction is applied.

In the position shown in FIG. 15, the isolated part 4 masks access to the conducting area so that it is not possible to reach it using a piece of wire.

As in the above embodiments, it is necessary to have a housing only at the electricity source end. However, as a security precaution, it is desirable to mount a second housing at the user member end, e.g. the ignition coil end, as well. However, the existence of a theft protection cable in accordance with the invention is particularly useful for the lengths of electric circuit which connect the battery to the ignition key and the ignition switch to the ignition coil.

Figure 16:
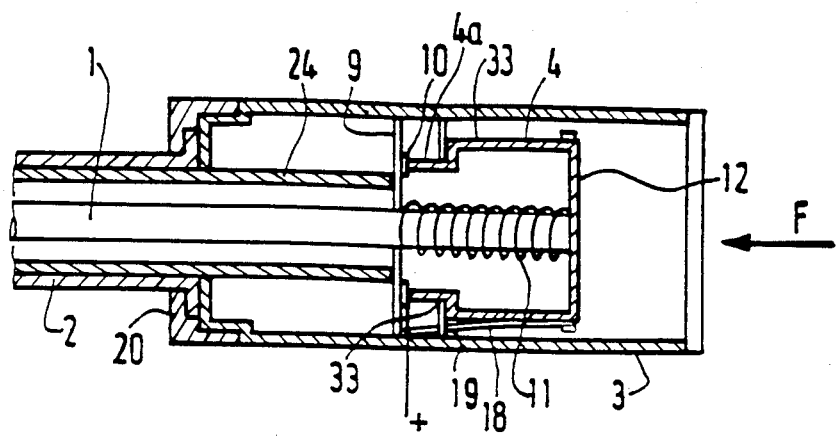
FIG. 16 is a diagrammatic section showing the positions of the various components of a housing in the conductive position.
Figure 17:
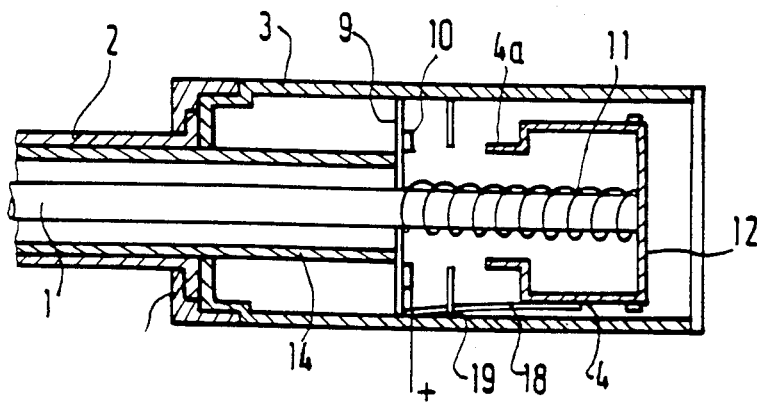
FIG. 17 is a similar diagram applicable to the case where the core and the sheath have been cut somewhere along their length.
Figure 18:
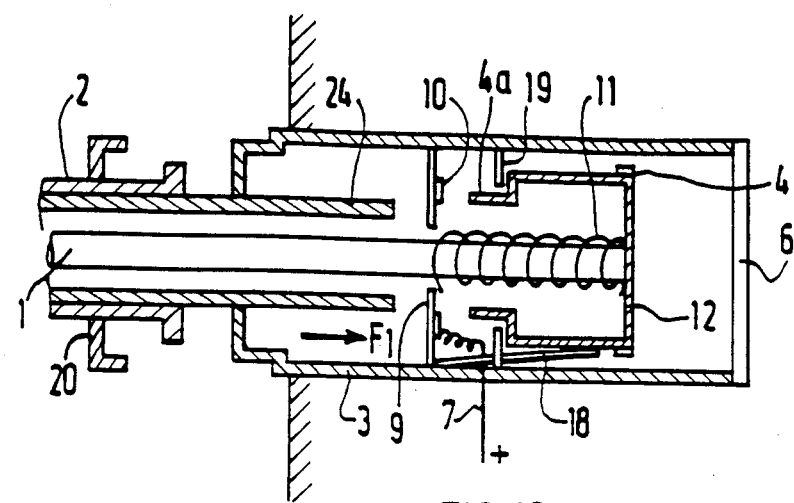
FIG. 18 is a similar diagram to the case where the sheath has been dismounted.

FIGS. 16, 17, and 18 show another embodiment in which the core 1 of the cable is surrounded by a sheath 2 and is fixed thereto. The end of the core 1 is fixed to a contact part 4 capable of moving inside the housing 3. Forward displacement (towards the cable) of the part 4 is limited by a plat 19 fixed inside the housing 3. The plate 19 has a central opening 33 through which the front portion 4a of the part 4 may pass. A single locking arm 18 is shown in the figures.

Naturally, in accordance with a characteristic of the invention, the core 1 is under tension either by means of a spring tab located at the other end of the cable, or else by similar means. Thus, in normal operation, the front portion 4a of the part 4 is engaged through the opening 33. It thus comes to bear against the contacts 10 of a contact-carrying plate 9 which is also movable within the housing 3. The plate 9 is urged to the right in the figure by a skirt 24 which is hollow and fixed to the sheath 2, and through which the core 1 passes. Thus, when the sheath 2 is screwed onto the body of the housing 3 by means of a nut 20, the skirt 24 moves to the right in the figure until contact is established between the plate 9 and the portion 4a. The core 1 is fixed to the end 12 of the part 4 and a spring 11 is interposed between the end 12 and the plate 9. Screwing the sheath by means of the nut 20 gives rise not only to the part 4 being brought into contact with the conducting area 10, but also to the spring 11 being compressed. Mechanical and electrical contact is thus established between the core 11 and the conducting area 10.

FIG. 16 shows the device in its normal operating position with the user member being fed from the battery or the alternator.

FIG. 17 shows the position of the members after the core and the sheath have been sheared at some point (not shown). At this moment, the tension exerted on the core disappears. As a result the spring 11 expands, thereby moving the part 4 to the right in the figure such that the front 4a of the part 4 loses contact with the conducting area 10. Contact is thus broken and no current can flow along the core 1. As mentioned below, contact cannot be re-established simply by applying traction to the core because of the locking means which are present.

FIG. 18 shows the case where the sheath has been dismounted. At this moment, the nut 20 being unscrewed releases the force exerted by the skirt 24 on the plate 9. The spring 11 is thus free to expand through the orifice 23 and it moves the plate 9 away from the front portion 4a of the part 4. Here again contact is broken between the area 10 and the part 4. The part 4 remains in its original position and, as mentioned above, contact can only be re-established by intervention of a specialist.

Figure 19:
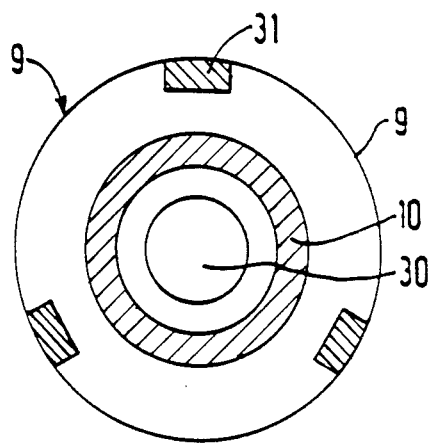
FIG. 19 is a view along arrow F of FIG. 18 showing the electrode carrier or contact-carrying plate.
Figure 20:
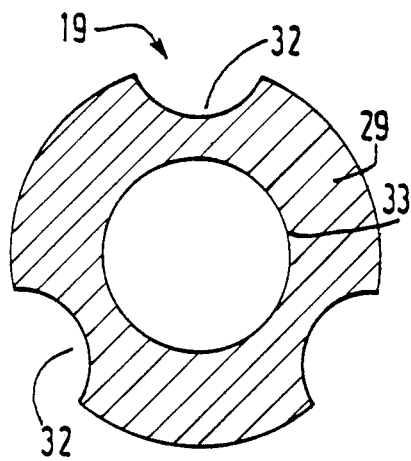
FIG. 20 is a similar view of the fixed plate.

FIGS. 19 and 20 are views along arrows F and F1 of FIGS. 16 and 18 showing the plates 9 and 19. Each of them has a central opening, respectively 30 or 33, with the opening 33 serving to pass the core 1 and the leading end 4a of the part 4, while the opening 30 serves to pass the core 1.

Resilient arms 18 are fixed to the plate 9. These arms extend perpendicularly to the surface shown so only the ends 31 thereof can be seen. These arms pass through notches 32 provided in the periphery of the disk 19.

Figure 21:
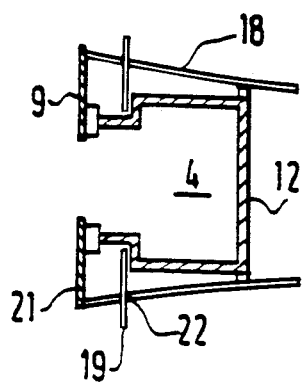
FIGS. 21 to 23 are diagrams showing the operation of the non-return lugs in the device.
Figure 23:
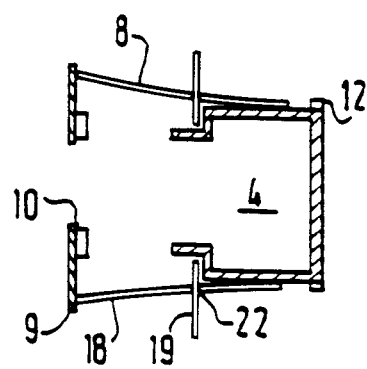

FIGS. 21 to 23 are diagrams showing the positions of the arms 18 in the cases shown by FIGS. 16 to 18. In FIG. 21, the free ends of the arms (of which there are four in the example shown, but there could be fewer or more) come into abutment on the outside of the disk 12 constituting the rear portion of the part 4. Thus, the part 4 can move to the right in the figure or rearwardly by deforming the arms 18. By virtue of the resilience of the arms 18, this motion causes the ends of the arms to bear against the outside wall of said part. This position is shown in FIG. 22. Thus, if the core 1 is pulled after being broken, the part 4 tends to be returned forwardly. However, the ends of the arms 18 bear against the abutment-forming collar 12 thus limiting the forwards displacement and opposing any re-establishment of electrical contact. The distance between the plates 9 and 19 remains the same in both cases.

FIG. 23 shows a contrasting case corresponding to that shown in FIG. 17. In this case, the sheath has been dismounted. At this moment, the effect of the spring 11 is to displace the plate 9 forwardly in the figure so as to move it away from the plate 19. Naturally, as it moves, it takes the arms 18 with it so that the ends thereof come down from the collar 12 and press against the side wall of the part 4. Here again, if the sheath is reassembled, the ends of the arms 18 slide along the side wall of the part 4 and come into abutment against the collar 12 so as to move it rightwardly (as shown in FIG. 22), thereby making contact impossible, yet again. Naturally, after an attempted theft, contact may be re-established but only by qualified personnel using specialized tooling.

Thus, by virtue of the dispositions of the present invention, a vehicle is protected against attempts at theft either by shearing the cable which causes the part 4 to move rearwardly, or else by dismounting the sheath which causes the contact-carrying plate 9 to move forwardly, with the passage of electrical current along the core being interrupted in either case.

Another embodiment is shown in FIG. 24. In this embodiment, the sheath 2 is made of plastic material or the like and is not particularly strong. A conductor 35 is embedded inside the sheath. As is conventional in motor vehicle electrical circuits, the conductor 35 is connected by a multi-pin connector between two pins 38a and 38b at the same time as the main conductor is connected. The pin 38a situated at the voltage feed end is connected firstly to the voltage source and secondly to the coil 43 of an electromagnet whose core is connected to an armature suitable for opening or closing a switch 34. The switch 34 is shown in the closed position and the other circuit components are shown in their operating positions. The coil of the electromagnet 43 may be connected to the voltage source via a suitable circuit so that the switch 34 remains closed so long as electrical current flows along the conductor 35. Naturally, any other means for switching off a current could be used, e.g. a thyristor. The switch 34 is connected firstly to the voltage source and secondly, via the housings 3, to the conducting core 1 so as to convey electricity to the terminal 27 of a user member. A voltage is applied to the conductor wire 35 which runs via the plug pin 38b and through a member 36 to ground. It is also possible to provide two conducting wires within the sheath 2 which are isolated from one another and which have their ends put into electrical contact by the connector tab 38b being engaged with a complementary connector. These two wires then constitute the circuit for setting up a holding current through the solenoid 43. FIG. 24 shows the wire 35 as a rectilinear conductor, however it is preferable for this wire to be wound in a spiral inside the sheath in order to make it difficult to identify during cutting.

This circuit operates as follows: in normal operation, the switch 34 is closed and conveys voltage via the housings 3 and the core 1 to terminal 27 of the user apparatus. Simultaneously, the solenoid 43 is powered and the circuit is looped to ground via the conductor 35. If the sheath is disconnected, the solenoid is no longer powered since contact is interrupted at one or other of the pins 38, and consequently the contactor 34 opens, thereby preventing current from flowing along the conducting core 1, and consequently taking voltage away from the terminal 27. Similarly, if the sheath is cut, the wire 25 is also cut and the contact 24 opens automatically so that it is no longer possible to start the vehicle, supposing the circuit described is connected to the ignition coil. Preferably, the switch 34 is provided with means for preventing it from being immediately put back into operation. The effectiveness of this theft protection circuit is then considerably reinforced. In this embodiment, the information concerning conduction along the circuit constitutes an electrical signal analogous to the mechanical signal used above.

FIG. 25 shows an ignition distributor comprising a body 37 and a cover 39. The top of the cover has a cylindrical tube 49 extending therefrom and terminated by a threaded portion for engaging a nut 20 fixed to the sheath 2 of an electricity feed cable. The core 1 of this cable is connected to a conductive skirt 24 which, under pressure from the nut 20 being screwed on the tube 49 urges the core 1 into electrical contact with a conducting area 10 connected to the high tension inlet tab. The cover 39 is fixed to the body 37 in conventional manner, i.e. by resilient toggles 40, or else by screws. The other end of the core 1 is connected to the coil by an assembly of the type described above such that when the sheath 2 is dismounted, it becomes impossible to pass an electric current along the core.

A recess 42 extends transversely to the top of the tube 49 and a locking member or part is housed therein, as shown in FIG. 26. This member includes a spring 55 and a locking plate 53 which is biassed by the spring 55. The front portion of the plate 53 has a notch 54. Initially, the plate 53 bears against the outer surface of the skirt 24 under pressure from the spring 55. When the nut 20 is unscrewed, the skirt 24 rises under the action of the spring 11 so that the edges of the notch 25 move under the groove 41 in the skirt 24. Thus, the skirt 24 is locked in its upper position and contact can no longer be established between the core 1 and the conducting area 10, nor can a conductor be passed through the skirt. Naturally, the space between the electrodes of the skirt 24 and the conducting area 10 is large enough to avoid arcing.

The plate 53 can be released solely by opening the recess 42 which firstly requires a certain amount of time and which secondly requires a special tool in order to allow the skirt 24 to move back into the tube. Naturally, the distance between the level of the plate 53 and that of the groove 31 in its in-use position is greater than the length of the screw thread 13 so as to ensure that the plate 53 cannot be broken by screwing, and the plate 53 is also made to be sufficiently strong. It is also possible to provide an opening in the skirt 24 to receive the plate 53.

Thus, it is no longer possible to obtain access to the high voltage inlet tab after the sheath has been dismounted, since the skirt 24 remains locked in its high position inside the tube, while the end of the skirt 24 is solid.

However, it is possible to separate the distributor head from the distributor body. A thief may have a spare distributor head. In order to avoid this drawback, metal rods 48 are provided inside thebody 37 at the periphery thereof and extending along the entire length of the body, said rods being interconnected at their bottom ends by a bracket 51.

The top portions of the rods 48 may be level with the top surface of the body 37 or they may project therefrom and engage in cavities provided for the purpose. The bracket 51 is kept away from the end of the body 37 by a return spring 57. In FIG. 25, the cover 39 is mounted on the body 37 and provides contact. When the cover is dismounted, the return spring 57 causes the rod 48 to project from the top surface of the body and a new cover cannot be mounted thereon since the high position of the rods 48 is locked by a housing 52 containing a pin or other locking means. In order to put the assembly back into working order, it is necessary to change the housing 52 or to recompress its spring. Thus, the rods 48 can only be retracted back into the body 37 by resetting the locking means 52, and this takes time.

The ignition coil is advantageously fixed to the distributor cover. Previously, the coil has been connected to the distributor by a suitably insulated electrical cable. This is because ignition coils were made using windings insulated by an oil that might leak. However, now that dry coils are available, there is no longer any need to separate the coil from the distributor, thus eliminating an electrical connection.

Figure 27:
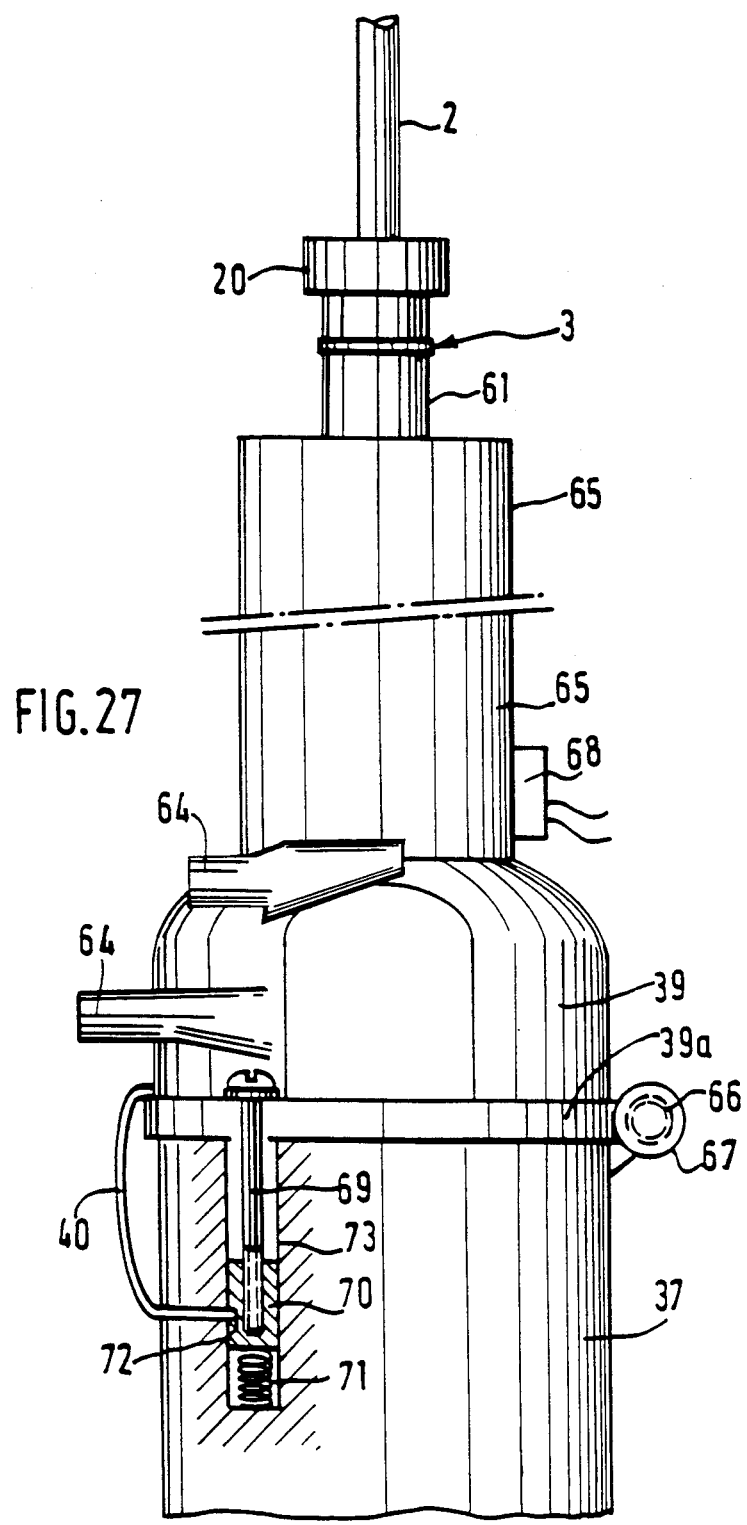
FIG. 27 is an overall view of an integrated distributor and ignition coil assembly, with the coil being provided with a housing in accordance with the invention.

In FIG. 27, the feed current arrives at the coil 65 via an external wire 2 connected to the battery by means of the contactor on the dashboard. The wire 2 is connected to the coil 65 by a device including a security contactor 3. Contact is established by screwing the nut 20 on the neck 61 of the coil. The coil 65 is connected by a switch device 68 to the contact breaker which, by breaking current in the primary circuit gives rise to very high tension in the secondary winding. As in the prior art, this very high tension is conveyed to a graphite electrode in contact with a distributor arm (not shown), with the distributor arm being driven by a mechanical take-off from the engine, such that the speed of distribution is directly proportional to engine revolutions.

The housing of the coil 65 is integrated in the cover 39 of the distributor. In the example shown, the bundle of electrical connections to the spark plugs is connected sideways relative to the cover, perpendicularly to the body of the distributor, and the end piece 64 of each wire is in the form of a cylinder (only two of which can be seen in the figure). The cover 39 bears against the body 37 of the distributor via a ring 39a which covers the top edge of the body 37.

In accordance with the invention, the cover 39 is hinged to the body 37 about a shaft 66 terminated by two end plates 67. In the example shown, the shaft 66 is on the opposite side to the connection end fittings 64. Naturally, the distributor arm (not shown) projects inside the cover and comes into contact with successive conducting areas for each of the end fittings at a moment when high tension is available. The distributor cover is closed onto the body thereof by means of one or more toggles 40 having one end hinged to the body 37 and the opposite end bearing resiliently against the ring 39a.

The cover may also be held down on the body by means of a screw 69 as shown in the figure. The head of the screw 69 bears against the ring 39a and its shank penetrates into a blind hole 73 having a nut 70 fixed therein by a pin 72 and biassed by a return spring 71. If, after opening the cover 39, a thief seeks to remove the toggle 40, he removes the pin 72 from the nut 70 and the spring 71 causes it to rise inside the bore 73. Then, if he tries to put a replacement cover in place of the original cover, there is no way of tightening a screw 69 since the nut 70 is free inside the bore 73. It is thus impossible to start the vehicle fraudulently by using a flying coil since, in any event, the distributor cover cannot be properly fastened to the body of the distributor.

Naturally, if the cover 39 is not hinged to the body 37 by means of a fixed shaft but is hinged by means of a loop passing through the cover 39, and having its ends penetrating into the body 37, these ends constitute the pins 72 so as to make it impossible to mount a spare head, regardless of whether the head includes its own coil or not. The loop may also be connected to an electric security circuit for preventing the engine from being started if it is broken.

I claim:

1. A theft protected electric cable comprising a conducting core, an insulating sheath surrounding the core and connection means, said cable being connected between an electric source and a user member by means of at least one contactor, the contactor comprising a housing, a first electrically conducting member and a second electrically conducting member in contact with the core, one of the conducting members being slidable within the housing between a first position wherein electrical current flows between the conducting members and a second position wherein no electrical current can flow between the conducting members, said core being permanently under mechanical tension to establish a mechanical and electrical contact between the conducting members, the said housing including no return means to prohibit the movement of the slidable conductive member from its second position to its first position, whereby the passage of electric current between the conducting members after a break of the cable will be prevented.

2. The cable according to claim 1 characterized in that the core (1) is rectilinear and/or linear over at least a portion of its length and a spring in contact with the core to provide the mechanical tension.

3. A cable according to claim 1 characterized in that the core of the cable is linear, at least in part, with the tension being established between the conducting members of the contactor giving rise to mechanical contact between the conducting member (4) fixed to the end of the core and the second conducting member (10) and to a spring (11) being compressed, the second conducting member being connected to a source of electricity or to a user apparatus.

4. A cable according to claim 1, wherein the core (1) is movable relative to the sheath, said core (1) being connected at at least one of its ends to a first conducting member capable of sliding inside the contactor, the first conducting member being biased by a spring; the cable being characterized by a sleeve (24) which surrounds the first conducting member.

5. A cable according to claim 1 for mounting a theft protection electric cable, wherein at least one end of the cable core (1) is fixed to the first conducting member (4) inside the contactor, and characterized in that the first conducting member is pressed against the second conducting by compression means (11), the no return means (25) preventing contact between the first conducting member and the second conducting member after the cable has been subjected to traction.

6. A cable according to claim 1, wherein the core and the sheath are capable of relative translation, the cable being characterized in that a sleeve (24) is fixed to the sheath, the sleeve surrounding a portion of the core (1) and penetrating into the housing (3) so as to come into abutment against the first conducting member (9), the front end of second conducting member (4) including a zone (4a) of small diameter capable of passing through an opening (30) formed through a plate (19) which is fixed inside the housing, and a spring (11) disposed between the end of the second conducting member (4) and the first conducting member (9).

7. A cable according to claim 6, characterized in that the first conducting member is provided with resilient tabs (18), having free ends, said free ends bearing against a flange (12) at the end of the first conducting member (4), the arms (18) serving to constitute locking abutments, with the passage of electricity being interrupted both when the core (1) is cut and when the sheath (2) is dismounted.

8. A cable according to claim 1, characterized in that at least one conductor wire (35) connected to electric current interrupting means (34, 43) of the type comprising a main circuit is embedded in the sheath (2), with a break in the conductor wire (35) causing the main circuit of the current interrupting means (34, 43) to be broken.

9. Theft A theft protection device for an automobile having an ignition distributor including a cable, a core, and a sheath characterized in that the sheath (2) is removably mounted on the end of the ignition distributor (39) of the type having a skirt, the core of the device being fixed to the skirt (34) to establish contact between the core (1) and a conducting area (10) of the distributor head while compressing a spring (11), so long as the sheath is properly mounted, with locking means (53, 55) preventing contact from being re-established after the mounting of the sheath is disturbed.

10. A motor vehicle distributor fitted with a theft protection device according to claim 9, the distributor comprising a body (37) and a head (39) removably mounted on the body, and being characterized in that the head (39) is hingedly connected to the body (37).

11. A distributor according to claim 10, characterized in that the ignition coil (65) is fixed to the distributor head (39).

* * * * *